United States Patent Office 3,787,494
Patented Jan. 22, 1974

3,787,494
N-(N,N-DIETHYLENEDIAMINE) SUBSTITUTED
AMIDES OF 1 - AMINOCYCLOPENTANECAR-
BOXYLIC ACID
Harvey E. Alburn, 1420 Carroll Brown Way, West
Chester, Pa. 19380, and Norman H. Grant, 2 Downs
Circle, Wynnewood, Pa. 19096
No Drawing. Filed Dec. 23, 1971, Ser. No. 211,782
Int. Cl. C07c 103/86
U.S. Cl. 260—557 R          8 Claims

ABSTRACT OF THE DISCLOSURE

The compounds are amides of 1-aminocyclopentane-carboxylic acid, having valuable pharmacodynamic properties in that they have both anti-inflammatory and immuno-suppressive activity in warm-blooded animals.

DESCRIPTION OF THE INVENTION

This invention relates generally to novel chemical compounds having valuable pharmacodynamic properties and to processes for preparing said compounds. The novel compounds of the invention are the amides of 1-amino-cyclopentanecarboxylic acid encompassed within the following general formula:

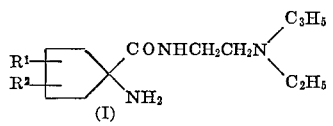

wherein $R^1$ and $R^2$ are each selected from the group consisting of hydrogen, lower alkyl, lower alkoxy, hydroxy, halogen, and nitro; and the pharmaceutically-acceptable acid-addition salts thereof.

The novel compounds of Formula I may conveniently be prepared by heat-reacting a selected N-carboxyanhydride of 1-aminocyclopentanecarboxylic acid with N,N-diethylenediamine in accordance with the following reaction scheme:

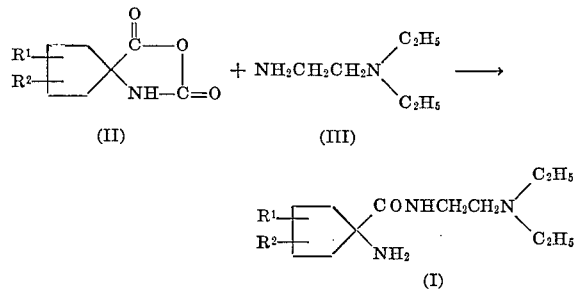

wherein $R^1$ and $R^2$ have the same meaning described hereinbefore.

The reactant (III), N,N-diethylenediamine, is, of course, commercially available. The reactants (II), the N-carboxyanhydrides of 1-aminocyclopentanecarboxylic acid, which are not commercially available, can easily be prepared in accordance with standard organic procedures well known to those skilled in the art. For example, a procedure which has been employed to synthesize the anhydrides of Formula II above utilized in the preparation of Compound I of the present invention, is described in U.S. Pat. No. 3,206,455, "Process for Producing 6-(α-aminoacylamino) Penicillanic Acids," H. E. Alburn and N. H. Grant.

It has been discovered that compounds of Formula I meeting the described qualifications have valuable pharmacological properties. More specifically, said compounds have been found to have unexpected anti-inflam-matory and immuno-suppressive activity, as referred to in greater detail hereinafter.

An inflammation is an abnormal condition of the tissues of some part of the body in which there is swelling, redness, heat and pain. It involves the process by which the body attempts to rid itself of bacteria, poisons, or other foreign substances which irritate or injure the tissues. The blood vessels in the affected part expand, causing more blood to flow into the irritated or injured area. The increased amount of blood in the affected part causes the redness, and the expanded blood vessels cause swelling. The accumulation of blood cells and expanded blood vessels press on sensory nerves to cause the pain that may accompany an inflammation. In those instances where the presence of bacteria is involved, white blood corpuscles pass through the blood vessels into the injured or invaded area to destroy many bacteria in situ. (The accumulation of bacteria and white corpuscles occurring in an inflammation is the matter termed "pus.")

It is well known that agents which are effective against inflammations are active also in preventing both the clinical and histopathologic changes which occur in experimentally induced granuloma in test animals. Such agents include the compounds prednisolone and phenylbutazone, each of which has been shown to be active against inflammations in test animals. Thus, experimentally induced inflammations in test animals may serve as a test standard for anti-inflammatory activity in general.

The experimentally induced inflammation found to be valuable for comparing the anti-inflammatory activity of a compound to be tested, with that of the aforesaid standard compound, may be caused by the insertion of cotton pellets into bilaterally adrenalectomized test animals in accordance with the procedure described by C. A. Winter et al. in Federation Proceedings, March-April, 1963, vol. 22, No. 2, part I.

Test Method A

Pursuant to the test procedure of C. A. Winter et al. referred to above, male Wistar rats, weighing 150± grams are bilaterally adrenalectomized. The adrenalectomized rats are anesthetized and two cotton pellets are inserted subcutaneously in each animal. The cotton pellets are preferably Johnson and Johnson Dental Rolls (1), having weight ranges of 38±1; 40±1; 41±1; 42±1; 43±1; and 44±1 mg. The animals are then provided with 1% saline solution containing 0.01% glucose, and a standard stock diet, and the room temperature maintained at 78°–80° F. Beginning on the same day of the insertion of the cotton pellets, treatment is instituted by oral administration of 1.5 and 3.0 mg. of selected test compounds in aqueous solution of carboxymethyl cellulose (0.5%) with respect to half the rats. The treatment is administered twice daily for five consecutive days for a total of ten doses.

All the rats (both those treated and the control group) are autopsied on the seventh day and the granulomas (cotton pellets) are removed. The pellets are dried for 72 hours at 80° C. and then maintained for 24 hours at room temperature. The pellets are then weighed individually to the nearest 0.1 mg.

The anti-inflammatory activity of the test compounds may then be expressed as percent inhibition, which is determined with the use of the following formula:

Percent inhibition=100

$$\times \frac{[\text{Av. pellet wt. increase for control minus av. pellet wt. increase for treated}]}{[\text{Av. pellet wt. increase for control}]}$$

The statistical significance and percent relative potency of the test compound is then compared with that of the reference standard used.

The immune response, production of antibodies, is the means by which immunity to infectious disease is generated and is an expression of the animal body's biochemical integrity. Malfunctions of this natural defense mechanism are known collectively as the immunopathies. These are characterized by altered response to external antigens, i.e., the manifestation of atopy or an allergy. They also include auto-immune phenomena. The body is normally tolerant to its own tissues and does not treat them as antigens (foreign substances). A breakdown of this tolerance (natural homeostatic mechanisms) is the basis of those pathologic entities grouped under the term, auto-immune diseases. In addition to the immunopathies, normal functioning of the immune system can be disadvantageous, for example by causing rejection of transplanted tissues or organs. Obviously, suppression of the immune response can be of major therapeutic importance in particular instances.

Test Method B

It is well known that agents which are effective in immunological diseases are active also in preventing both the clinical and histopathologic changes which occur in experimental allergic encephalomyelitis (EAE). Such agents include the compounds thioguanine, Imuran, 6-mercaptopurine, cyclophosphamide, methotrexate and cortisone, all of which have been shown to be active in human immunopathies. Thus, the disease EAE may serve as a test standard, not only for some demyelinating diseases, more notably multiple sclerosis, but for auto-immune processes in general (cf. N. W. Brandriss, J. W. Smith, R. N. Friedman, "Suppression of Allergic Encephalomyelitis by Antimetabolites"; Ann. N.Y. Acad. Sci., 122:356, 1965).

EAE is characterized by a delayed (cellular) hypersensitivity which is tissue specific and results in clinical paralysis of the animal. Histopathological lesions of the spinal cord and brain caused by said disease resemble those in human demyelinating disease, and it is thus classified as an experimental auto-allergic or auto-immune disease (cf. B. H. Waksman, "Experimental Allergic Encephalomyelitis and the 'auto-allergic' Diseases," I. Arch. Allerg. appl Immunol., 14 (suppl.) 1, 1959; and I. R. Mackay and F. M. Burnet, "Auto-Immune Diseases, Pathogenesis, Chemistry and Therapy," Charles C. Thomas, Springfield, 1963).

In the exercising of the method of the invention, the compounds of Formula I used therein may be administered alone or in combination with pharmaceutically-acceptable carriers, and the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is, intramuscularly, intravenously or subcutaneously. For parenteral administration, they may be used in the form of sterile solutions containing other solutes, for example, enough saline or glucose to make the solutions isotonic. As is well known in this general art, the compounds may be used in the form of their bases, or as the pharmaceutically-acceptable acid-addition salts thereof; e.g., as their hydrochlorides, hydrobromides, acetates, sulfonates, propionates, and the like.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The following examples are illustrative of the preparation of the Compounds I having the aforesaid activities:

EXAMPLE I 1-amino-N-(2-diethylaminomethyl)cyclopentanecarboxamide dihydrochloride A mixture of 2 g. of N,N-diethylenediamine, 100 ml. of ethyl acetate, and 2.5 g. of N-carboxy-1-aminocyclopentanecarboxylic acid anhydride was refluxed for 2 hours. The solvent was removed under vacuum, and 17.2 ml. of 2 M HCl in ethanol was added. Ethyl ether was then added, and a gummy precipitate formed. This was recrystallized from ethanol-ether, giving 3.79 g. of the white dihydrochloride.

*Analysis.*—Calcd. for $C_{12}H_{25}N_3O \cdot 2HCl$ (percent): C, 48.2; H, 8.76; N, 14.05. Found (percent): C, 48.3; H, 8.76; N, 14.19.

The product shows anti-inflammatory and immunosuppressive activities in the respective tests A and B described hereinbefore.

EXAMPLE II

Following the procedure of Example I, a series of N-carboxyanhydrides of 1-aminocyclopentanecarboxylic acid (II) are each reacted with N,N-diethylenediamine (III) to prepare the corresponding derivatives of 1-aminocyclopentanecarboxylic acid (I), which have both anti-inflammatory and immuno-suppressive activity in warm-blooded animals, as demonstrated by the standard pharmacological procedures hereinbefore. The reactants (II) which are reacted in each instance with N,N-diethylenediamine, and the resulting Compounds I of the invention having said activities, are set forth in Table A below:

TABLE A

| N-carboxyanhydride of 1-ACPCA (II) | Resulting amide (I) |
| --- | --- |
| N-carboxy-2-methyl-1-aminocyclopentanecarboxylic acid. | 2-methyl-1-amino-N-(2-diethylaminoethyl)cyclopentanecarboxamide. |
| N-carboxy-2-ethyl-3-propyl-1-aminocyclopentanecarboxylic acid. | 2-ethyl-3-propyl-1-amino-N-(2-diethylaminoethyl)cyclopentanecarboxamide. |
| N-carboxy-2-ethoxy-1-aminocyclopentanecarboxylic acid. | 2-ethoxy-1-amino-N-(2-diethylaminoethyl)cyclopentanecarboxamide. |
| N-carboxy-3-hydroxy-1-aminocyclopentanecarboxylic acid. | 3-hydroxy-1-amino-N-(2-diethylaminoethyl)cyclopentanecarboxamide. |
| N-carboxy-2-bromo-1-aminocyclopentanecarboxylic acid. | 2-bromo-1-amino-N-(2-diethylaminoethyl)cyclopentanecarboxamide. |
| N-carboxy-3-nitro-1-aminocyclopentanecarboxylic acid. | 3-nitro-1-amino-N-(2-diethylaminoethyl)cyclopentanecarboxamide. |
| N-carboxy-2-methoxy-3-fluoro-1-aminocyclopentanecarboxylic acid. | 2-methoxy-3-fluoro-1-amino-N-(2-diethylaminoethyl)-cyclopentanecarboxamide. |
| N-carboxy-2-chloro-3-propoxy-1-aminocyclopentanecarboxylic acid. | 2-chloro-3-propoxy-1-amino-N-(2-diethylaminoethyl)cyclopentanecarboxamide. |
| N-carboxy-2,3-dinitro-1-aminocyclopentanecarboxylic acid. | 2,3-dinitro-1-amino-N-(2-diethylaminoethyl)cyclopentanecarboxamide. |

We claim:

1. A compound of the group having the following formula

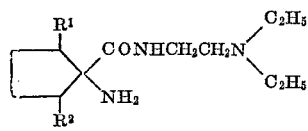

wherein $R^1$ and $R^2$ are each selected from the group consisting of hydrogen, lower alkoxy, hydroxy, halogen, and nitro; with the proviso that either $R^1$ or $R^2$ is always hydrogen; and the pharmaceutically-acceptable acid-addition salt thereof.

2. A compound of the group having the following formula

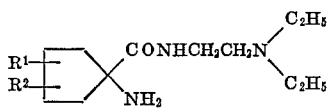

wherein R¹ and R² are each selected from the group consisting of lower alkyl and hydrogen.

3. A compound which is 3-hydroxy-1-amino-N-(2-diethylaminoethyl)cyclopentanecarboxamide.

4. A compound as defined in claim 12, which is 2-methyl - 1 - amino - N - (2 - diethylaminoethyl)cyclopentanecarboxamide.

5. A compound as defined in claim 12, which is 2-ethyl-3 - propyl - 1 - amino - N - (2 - diethylaminoethyl)cyclopentanecarboxamide.

6. A compound as defined in claim 12, which is 2-ethoxy - 1 - amino - N - (2 - diethylaminoethyl)cyclopentanecarboxamide.

7. A compound as defined in claim 12, which is 2-bromo - 1 - amino - N - (2 - diethylaminoethyl)cyclopentanecarboxamide.

8. A compound as defined in claim 12, which is 1-amino - N - (2 - diethylaminoethyl)cyclopentanecarboxamide dihydrochloride.

References Cited
UNITED STATES PATENTS 2,437,545   3/1948   Martin et al. _____260—557

HARRY I. MOATZ, Primary Examiner

U.S. Cl. X.R.

424—320